UNITED STATES PATENT OFFICE.

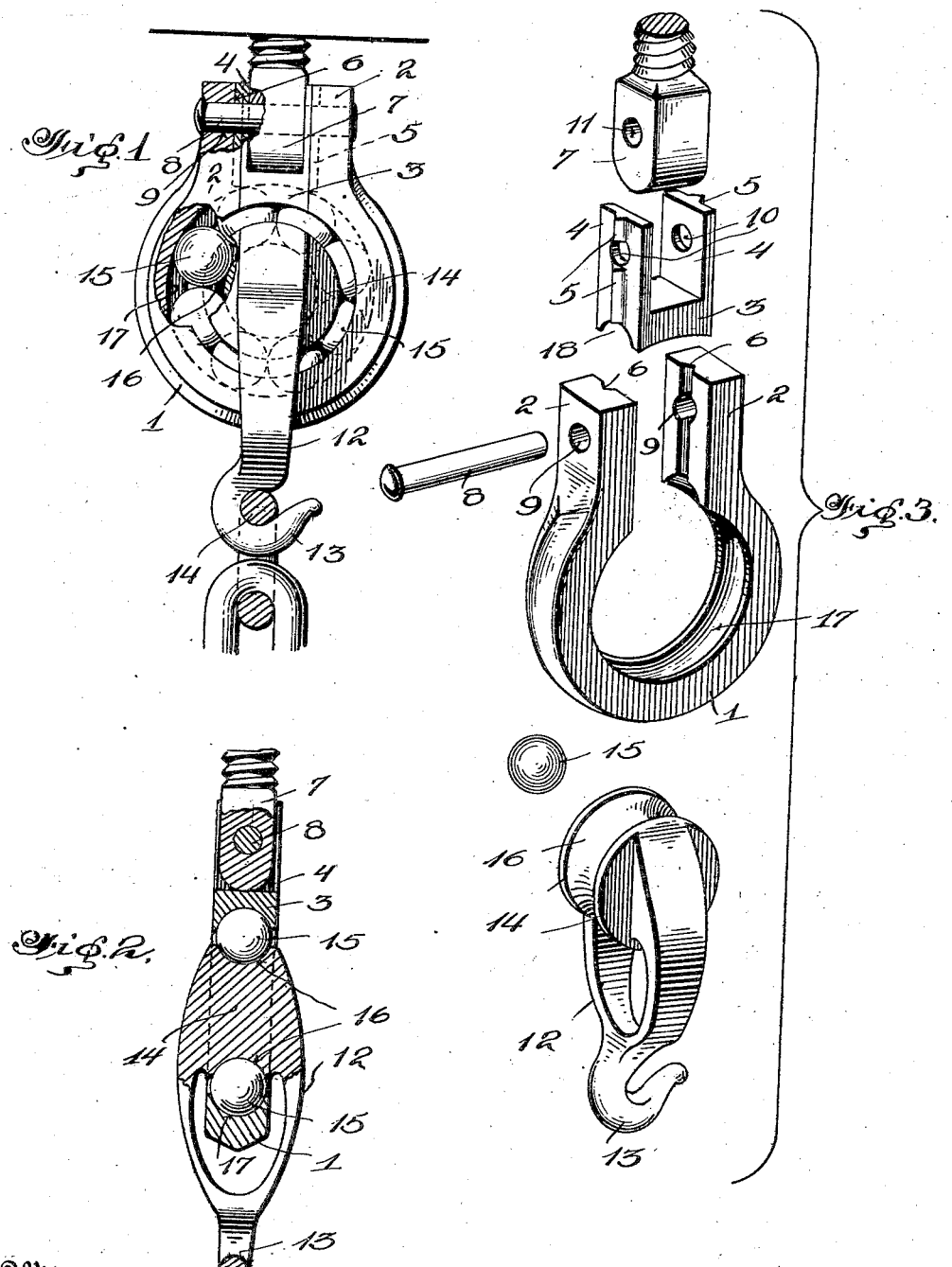

HAROLD SLASOR, OF NEW PHILADELPHIA, OHIO.

SUSPENDING-HOOK.

1,228,490.  Specification of Letters Patent.  Patented June 5, 1917.

Application filed December 20, 1916. Serial No. 138,090.

*To all whom it may concern:*

Be it known that I, HAROLD SLASOR, a citizen of the United States, residing at New Philadelphia, in the county of Tuscarawas and State of Ohio, have invented a new and useful Suspending-Hook, of which the following is a specification.

My invention relates to improvements in suspending hooks in which a housing or yoke is employed, to which is pivotally attached a suspending or connecting bolt, also a series of anti-friction balls located within the housing and surrounding a grooved disk, which grooved disk is provided with a swinging yoke and connecting hook.

The present invention has more specific reference to hooks designed to support swings, hammocks and like articles.

The objects of the present invention are, first, to provide a suspending hook so constructed that a compound swinging movement is produced, second, to reduce the friction, third, to eliminate any squeaking or grating sound, and fourth, to prevent rapid wearing of the parts.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawing:

Figure 1 is a side elevation showing parts in section.

Fig. 2 is a transverse vertical section.

Fig. 3 is a view showing the different parts disconnected and in proper position to be assembled.

Similar numerals of reference indicate corresponding parts throughout the several figures of the drawing.

In the accompanying drawings, the numeral 1 indicates the housing or main yoke which is preferably formed circular or so formed that a circular opening will be formed. The yoke or housing 1 is provided with the spaced parallel bars 2 which are for the purpose of receiving and holding the filling block or head 3, which block or head is provided with the spaced members 4. The outer faces of the spaced members 4 are provided with the ribs 5 which ribs fit in the grooves 6 formed in the inner faces of the spaced bars 2. The purpose of the ribs and grooves 5 and 6 is to prevent relative movement as between the filling block 3 and the bars 2. To the spaced members 2 is attached the suspending bolt 7 by means of the cross bolt or rivet 8, which cross bolt or rivet is located through the various apertures 9, 10 and 11, said apertures being formed in the bars 2, spaced bars 4 and the head of the suspending bolt 7 and when the bolt 8 is placed in the position illustrated in Fig. 1 the parts through which the bolt 8 is passed will be connected together and in such a manner that all of the parts connected by the suspending bolt 7 can swing upon the bolt 8.

The yoke 12 is provided at its outer or lower end with the connecting hook 13, to which hook is attached a ring or chain link 14, but it will be understood that the part or parts connected to or carried by the hook 13 do not pertain to the present invention so far as detailed construction is concerned.

The yoke 12 is provided with circumferentially grooved disk or wheel 14, which is formed of a diameter less than the diameter of the central opening formed by the housing 1 and the filling blocks 3 and is so formed for the purpose of receiving the anti-friction balls 15, which balls are seated in the groove 16 formed in the disk 14, said anti-friction balls being also seated in the groove 17 formed in the housing 1 and in the groove 18 formed in the filling block 3, by which arrangement a free swinging movement can be imparted to the yoke 12, said yoke being carried upon the anti-friction balls 15 and the groove wheel or disk 12.

It will be understood that by my peculiar arrangement I am enabled to provide a suspending hook for swings, hammocks and like articles in which a compound swinging movement is permitted and by suspending the yoke 12 upon anti-friction balls, a free swinging movement is produced and at the same time all disagreeable squeaking common to swing and hammock hooks is eliminated.

It will be understood that by providing the removable filling block 3 the various parts carried by the housing 1 can be assembled and after the filling block 3 has been properly connected said parts will be held against displacement.

Having fully described my invention, what I claim as new and desire to secure by Letters Patent, is—

1. In a suspending hook, the combination of a housing provided with spaced bars and an opening located between said spaced bars, a circumferentially grooved disk located within the housing and a series of anti-friction balls located within the housing and around the disk within the housing and a filling block adapted to close the opening around the disk and a suspending hook carried by said housing.

2. In a suspending hook, the combination of a housing, said housing provided with spaced arms, a filling block provided with spaced members adapted to fit against the inner faces of the spaced arms, a suspending bolt pivotally connected to the spaced arms, a disk located within the housing, a series of anti-friction balls located around the disk and within the housing and filling block, a hooked yoke carried by the disk.

3. In a suspending hook of the class described, the combination of a housing provided with a circular opening, the wall of said opening provided with a groove, spaced arms extended from the housing, a filling block provided with a groove located between the spaced arms, a circumferentially grooved disk located within the housing and a series of anti-friction balls located around the grooved disk and within the housing, a hooked yoke suspended from the grooved disk and carried thereby and a suspending bolt pivotally connected to the spaced arms.

4. In a suspending hook of the character described, a housing provided with spaced arms, a filling block provided with spaced members, a suspending bolt pivotally connected to the spaced arms, a disk located within the housing, a series of anti-friction balls located between the disk and housing and a hooked swinging yoke carried by the disk.

5. In a suspending hook of the character described, a housing provided with spaced arms, a filling block provided with spaced members, a suspending bolt pivotally connected to the spaced arms, a disk located within the housing, a series of anti-friction balls located between the disk and housing and a hooked swinging yoke carried by the disk, and means for pivotally connecting the suspending bolt to the housing.

In testimony that I claim the above, I have hereunto subscribed my name.

HAROLD SLASOR.